United States Patent
Rossini

(10) Patent No.: US 9,250,460 B2
(45) Date of Patent: Feb. 2, 2016

(54) LIQUID CRYSTAL DISPLAY COMPRISING ERASE ELECTRODES

(75) Inventor: Umberto Rossini, Coublevie (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 190 days.

(21) Appl. No.: 14/127,938

(22) PCT Filed: May 11, 2012

(86) PCT No.: PCT/EP2012/058774
§ 371 (c)(1),
(2), (4) Date: Jan. 14, 2014

(87) PCT Pub. No.: WO2012/175250
PCT Pub. Date: Dec. 27, 2012

(65) Prior Publication Data
US 2014/0132644 A1   May 15, 2014

(30) Foreign Application Priority Data
Jun. 20, 2011   (FR) ...................................... 11 55391

(51) Int. Cl.
*G09G 5/10*  (2006.01)
*G02F 1/133*  (2006.01)
*G02F 1/1343*  (2006.01)
*G09G 3/36*  (2006.01)

(52) U.S. Cl.
CPC ...... *G02F 1/13306* (2013.01); *G02F 1/134363* (2013.01); *G09G 3/3648* (2013.01); *G09G 3/3659* (2013.01); *G02F 2201/121* (2013.01); *G09G 2300/043* (2013.01); *G09G 2300/0426* (2013.01); *G09G 2300/0434* (2013.01); *G09G 2310/0235* (2013.01); *G09G 2310/061* (2013.01); *G09G 2320/0252* (2013.01)

(58) Field of Classification Search
None
See application file for complete search history.

(56) References Cited

U.S. PATENT DOCUMENTS

| | | | |
|---|---|---|---|
| 2004/0140972 A1 | 7/2004 | Hirota et al. | |
| 2005/0088600 A1 | 4/2005 | Mizoguchi | |
| 2005/0105033 A1 | 5/2005 | Itou et al. | |
| 2007/0040783 A1 | 2/2007 | Kawada et al. | |
| 2007/0252938 A1* | 11/2007 | Choi | G02F 1/134363 349/141 |
| 2008/0001873 A1 | 1/2008 | Choi | |
| 2010/0020283 A1 | 1/2010 | Suzuki | |

FOREIGN PATENT DOCUMENTS

WO    01/91098 A1    11/2001

OTHER PUBLICATIONS

Search Report dated Jul. 3, 2013 for International Patent Application No. PCT/EP2012/058774.

* cited by examiner

*Primary Examiner* — Grant Sitta
*Assistant Examiner* — Kirk Hermann
(74) *Attorney, Agent, or Firm* — Baker & Hostetler LLP

(57) ABSTRACT

Active matrix liquid crystal displays, mainly applicable to screens with small dimensions, fabricated for example starting from silicon substrates, are especially applicable to display operation in color sequential mode. The pixel comprises a pixel electrode controlled by a control transistor and counter-electrodes situated on the same side of the liquid crystal as the pixel electrode and parallel to the pixel electrode; the liquid crystal is composed of molecules having a natural rest orientation in the absence of a voltage between the pixel electrode and the counter-electrodes and a different orientation in the presence of an electric field created between the pixel electrode and the counter-electrodes. Erase electrodes are situated on either side of the pixel in a transverse direction with respect to the counter-electrodes and are designed to produce, during an erase phase, an erase electric field tending to return the molecules of the liquid crystal to their rest orientation.

15 Claims, 5 Drawing Sheets

LIQUID CRYSTAL DISPLAY COMPRISING ERASE ELECTRODES

CROSS-REFERENCE TO RELATED APPLICATIONS

This application is a National Stage of International patent application PCT/EP2012/058774, filed on May 11, 2012, which claims priority to foreign French patent application No. FR 1155391, filed on Jun. 20, 2011, the disclosures of which are incorporated by reference in their entirety.

FIELD OF THE INVENTION

The invention relates to active matrix liquid crystal displays. It is mainly applicable to screens using transmissive cells and notably to screens with small dimensions, fabricated for example starting from silicon substrates (LCOS technology or "Liquid Crystal on Silicon"); it is especially applicable to display operation in color sequential mode, for direct viewing or for projection.

An active matrix display usually comprises a matrix of rows and columns of pixels, each pixel comprising a liquid crystal cell, a pixel electrode which receives a voltage corresponding to luminance information, and a counter-electrode which defines a reference potential (which can vary from one image frame to the next so as to alternate the direction of the applied electric fields). The voltage applied between the pixel electrode and the common electrode produces an electric field which orients the molecules of the liquid crystal according to the modulus of the field. This orientation acts on the polarization of the light passing through the crystal in such a manner as to define, in combination with the use of polarizers, a level of light transmission which depends on the applied electric field. A control transistor (the active element of the pixel) connects the pixel electrode of all the pixels of the same column to a respective column conductor. At a given moment, the column conductor receives an analog voltage defining a gray-scale level to be applied to the pixel; if the transistor is conducting, this voltage is applied to the pixel electrode; otherwise, the pixel behaves as an isolated capacitor and conserves the voltage level received previously. The control transistors of the same row of pixels are controlled by a respective row conductor; thus, during the writing of an image frame, the various rows of the matrix are addressed successively so as to write, at a given moment in time, into each of the pixels of the row being addressed the information on luminance level applied at that moment by a column conductor associated with this pixel. The information written into the pixels of a row is held capacitively during the writing of the pixels of the other rows then for all the remainder of an image frame. A storage capacitor can be placed in parallel between the electrodes of the pixel in order to aid this capacitive retention.

BACKGROUND

FIG. 1 shows the general structure of such a matrix, where CL denotes a liquid crystal cell and Q denotes the transistor associated with this cell, the whole assembly of the cell and of the transistor forming the pixel. The counter-electrode of the cell is denoted by CE, and the electrode of the pixel is denoted by Ep. The row control conductors are denoted by $L_1$ to $L_n$ for a matrix with n rows. The column conductors are $C_1$ to $C_m$ for a matrix with m columns. A row decoder DEC addresses the various rows successively. During the addressing of a row, a digital-analog conversion circuit DAC applies a set of analog voltages to the column conductors representing the image to be displayed by this row. The conversion circuit establishes these analog voltages starting from a digital signal. A sequencing circuit SEQ ensures the synchronized operation of the row decoder and of the conversion circuit DAC.

In most liquid crystal displays, the liquid crystal is placed between a plane containing the counter-electrode and a plane containing the pixel electrode and the control transistor. The counter-electrode is common to all the pixels of the matrix and covers the whole matrix. The pixel electrodes each cover a large part of the pixel. The pixel electrode and the counter-electrode are transparent (made of indium-tin oxide ITO) in the case of a transmissive display; one of the two is reflecting in the case of a reflective display. The electric field applied is perpendicular to the plane of the display. At rest, in other words in the absence of this field, the molecules tend to be oriented in the plane (or respectively perpendicularly to this plane, depending on the type of molecule). In the presence of an electric field, their orientation re-aligns so as to become perpendicular (respectively parallel) to the plane.

The use of indium-tin oxide involves costly fabrication operations; the material is costly; moreover, this material has a high optical index (almost equal to 2) and causes undesirable reflections and hence losses of light; lastly, it is not perfectly transparent, notably in the green wavelengths where the eye is particularly sensitive; its thickness cannot be reduced too much in order to make it more transparent because it needs to remain sufficiently conducting in order to establish uniformly the desired electric field.

In order to avoid the drawbacks of indium-tin oxide, displays have already been provided in which the applied electric field is in the plane of the display rather than perpendicular to this plane. These displays are referred to as "In-Plane Switching Displays". At rest, the molecules are for example oriented in a direction Ox of this plane; when an electric field is applied in a direction Oy different from Ox but still in the same plane, the molecules of the liquid crystal tend to rotate in the plane and to orient themselves in the direction Oy. The polarization of the light which results from this rotation of the molecules is modified. Upstream and downstream polarizers allow the intensity of light which passes through the display to be modulated in proportion to the variations in orientation of the molecules.

In these displays, the electric field is applied between two electrodes situated in the plane of the display. The counter-electrodes are placed along the edges of the pixel. If the dimensions of the pixels are small (a few micrometers on a side), a single electrode placed in the middle of the gap between the counter-electrodes suffices for establishing an electric field capable of making the molecules rotate with a reasonably low voltage (a few volts). For pixels with larger dimensions, pixel electrodes and counter-electrodes may be interleaved in order to establish this field. The electrodes and counter-electrodes do not need to be transparent because they only occupy a fraction of the surface area of the pixel. They can be formed prior to the installation of the liquid crystal using a non-transparent metal conventionally used in microelectronics technologies (aluminum, copper, etc.).

In-plane switching displays are furthermore better from the point of view of the angle under which they can be viewed. This comes from the fact that the ellipsoid of the indices of the molecules used is oriented with its large axis in the plane both at rest and when an electric field is applied; the variations in optical delay of the light as a function of the viewing angle are smaller than when the molecules have their index ellipsoid oriented vertically (as is the case for conventional switching displays using an electric field perpendicular to the plane).

However, one drawback of in-plane switching displays is the fact that the return forces exerted on the molecules to return them to their rest position after removal of the electric field are not very high. The reason for this is that only the twist forces act but not the splay forces or the bend forces which are exerted in the case of rotations out of the plane.

This results in a limitation in the speed with which it is possible to go from one image to another.

This flaw is particularly sensitive if the display has to operate in color sequential mode. It is recalled here that this mode consists in successively displaying on the same liquid crystal matrix three images corresponding to the three primary colors to be displayed and in illuminating the matrix with a source of one primary color in strict synchronism with the display of the image corresponding to this color. Color sequential mode is advantageous because it avoids having three different matrices for displaying the three colors or having a mosaic of colored filters on a single matrix. However, on the downside, in order to display color images at a given rate (24 images per second for example), the matrix has to display partial images at a rate that is three times higher (72 images per second).

SUMMARY OF THE INVENTION

One goal of the invention is to provide an active matrix display, of the in-plane switching type, which displays images at a high rate and which is usable notably for an operation in color sequential mode.

It will be noted that the inclusion within each pixel of two additional electrodes and three additional transistors has already been proposed (US2007/0252938). The additional electrodes are used in turn as pixel electrodes for displaying a gray-scale level and as an erase electrode for removing this level. This device is not adapted to a color sequential mode, but is designed for a line by line scanning television screen.

The invention provides a liquid crystal display comprising a matrix of horizontal rows and vertical columns of pixels and, for each pixel, a liquid crystal cell, a pixel electrode controlled by a control transistor and at least two counter-electrodes situated on the same side of the liquid crystal as the pixel electrode, parallel to the pixel electrode and common to all the pixels of the same horizontal row, the liquid crystal being composed of molecules having a natural rest orientation in the plane of the display in the absence of a voltage between the pixel electrode and the counter-electrodes and another orientation in the plane of the display in the presence of a voltage between the pixel electrode and the counter-electrodes, this display being characterized in that it furthermore comprises an array of erase electrodes, each erase electrode running along a vertical column of pixels and being common to all the pixels of this vertical column, and means for applying between two neighboring erase electrodes, during an erase phase common to all the pixels of the matrix, an erase electric field in a direction tending to return the molecules of the liquid crystal toward their rest orientation.

The erase electrode is preferably situated on the same side of the liquid crystal as the other electrodes. This configuration avoids the plate (for example made of glass), which will encapsulate the liquid crystal on the opposite side from the substrate comprising the active matrix, having to undergo technological steps requiring alignments; the fabrication cost is thus significantly reduced. The erase electrode is formed with the active matrix preferably on a silicon substrate whose useful part (comprising the active matrix and the erase electrode) is subsequently transferred, according to the usual techniques associated with standard transmissive cells, onto a glass substrate which will be used as a support medium for the liquid crystal.

There are preferably two erase electrodes for each vertical column of pixels, one on either side of the pixel, and the erase electric field is established by applying different potentials to the two erase electrodes that frame the pixel. The erase electrodes are then preferably shared between two adjacent pixels, in other words an erase electrode situated on one side of the pixel is also used as erase electrode for the adjacent pixel. The counter-electrodes are also situated on either side of the pixel and they are shared between two adjacent pixels. It may however also be envisioned for the erase electrodes to be less numerous than the vertical columns of pixels, for example one electrode for every two columns if the electric field that they produce between them is sufficiently strong to act on the molecules of two adjacent pixels.

Preferably, the erase electrodes are arranged electrically into two groups of interleaved electrodes, for a common erasure of the whole matrix, an electric field being established between two neighboring electrodes, one belonging to the first group, the other to the second group. For example, if there are as many electrodes as there are vertical columns of pixels, one electrode associated with an even column belongs to the first group and one electrode associated with an odd column belongs to the second group.

The erase electrodes, like the pixel electrodes and the counter-electrodes, do not need to be made of indium-tin oxide; they can be of non-transparent, or even opaque, conducting metal such as copper or aluminum.

The counter-electrodes are parallel to the rows or to the columns of pixels, in other words the horizontal rows can be rows or columns, the vertical columns being reciprocally columns or rows; the word row is associated here with a notion of addressing (there are addressing row conductors) and the word column is associated with a notion of application of luminance data: voltage levels representing the luminance arrive via column conductors. Preferably, the erase electrodes are perpendicular to the counter-electrodes, or else to the direction of orientation of the molecules at rest. One erase electrode is common to all the pixels of the same row or column.

The erase electrodes, the pixel electrodes and the counter-electrodes are preferably formed within a conducting metal level as close as possible to the liquid crystal so that the action of the electric fields they generate are as efficient as possible. The row and column conductors of the matrix may be formed within levels further away. If the erase electrodes and the counter-electrodes are formed within the same level of conducting metal, the crossing points between these electrodes (which must not touch) may be obtained by using vias and conducting levels further away from the liquid crystal.

It may advantageously be provided for the orientation of the liquid crystal molecules at rest to be slightly tilted (in other words angularly offset) with respect to the direction of the pixel electrode and of the counter-electrode, in order to favor a given sense of rotation of the molecules when a write electric field is applied. The tilt is given by rubbing against the surface of one of the walls enclosing the liquid crystal. The tilt is preferably less than 20°, preferably between 5° and 15°, preferably equal to 10° or close to 10°.

The display of an image frame is then broken down into:
an erase phase during which a potential difference is applied between two erase electrodes framing a pixel;
an image write phase, during which the erase electrodes are preferably held in a high impedance state, the counter-electrodes are held at a reference potential, and an analog voltage representing the luminance is applied to the pixel electrode, and a hold phase during which the erase electrodes and the pixel electrode are placed in a high impedance state, and the counter-electrodes are held at the reference potential.

The display preferably furthermore comprises means for holding the pixel electrode and the counter-electrodes in a high impedance state during at least a part of the erase phase.

The erase phase can comprise at least two steps for controlling the erase electrodes of two adjacent vertical columns in at least two phases in such a manner as to establish an erase electric field in alternate directions between these electrodes during an erase phase.

The erase electrode is preferably superposed on an addressing row conductor of the pixel or on a column conductor supplying luminance data to be applied to the pixel; this allows the optical aperture surface area of the pixel to be masked as little as possible. The counter-electrodes are, in the same way, superposed on a column conductor (if the erase electrode is superposed on an addressing row conductor) or on an addressing row conductor (if the erase electrode is superposed on a column conductor).

The display is preferably a small display fabricated using LCOS technology starting from a semiconductor wafer allowing the collective fabrication of a multiplicity of displays simultaneously according to fabrication techniques for integrated circuits. The pixels have preferably a surface area of 10 to 100 square micrometers. The operation is preferably in color sequential mode, in other words the display comprises means for synchronizing the active matrix with respect to the ON and OFF control of colored light sources illuminating the matrix. The display is preferably of the transmissive type. It is preferably a display designed for image projection; it can also be a display intended for direct viewing.

BRIEF DESCRIPTION OF THE DRAWINGS

Other features and advantages of the invention will become apparent upon reading the detailed description that follows and which is presented with reference to the appended drawings in which.

DETAILED DESCRIPTION

Although the invention is applicable to displays using transmissive cells of any type (direct viewing or otherwise, monochrome or color, with or without colored filters), it is considered in the following that the display is of the color type operating in color sequential mode. In the following, the term "frame" will be used for defining the writing of a complete image of a single color on the screen; three successive frames correspond to three different colors in color sequential mode.

Figure 1:
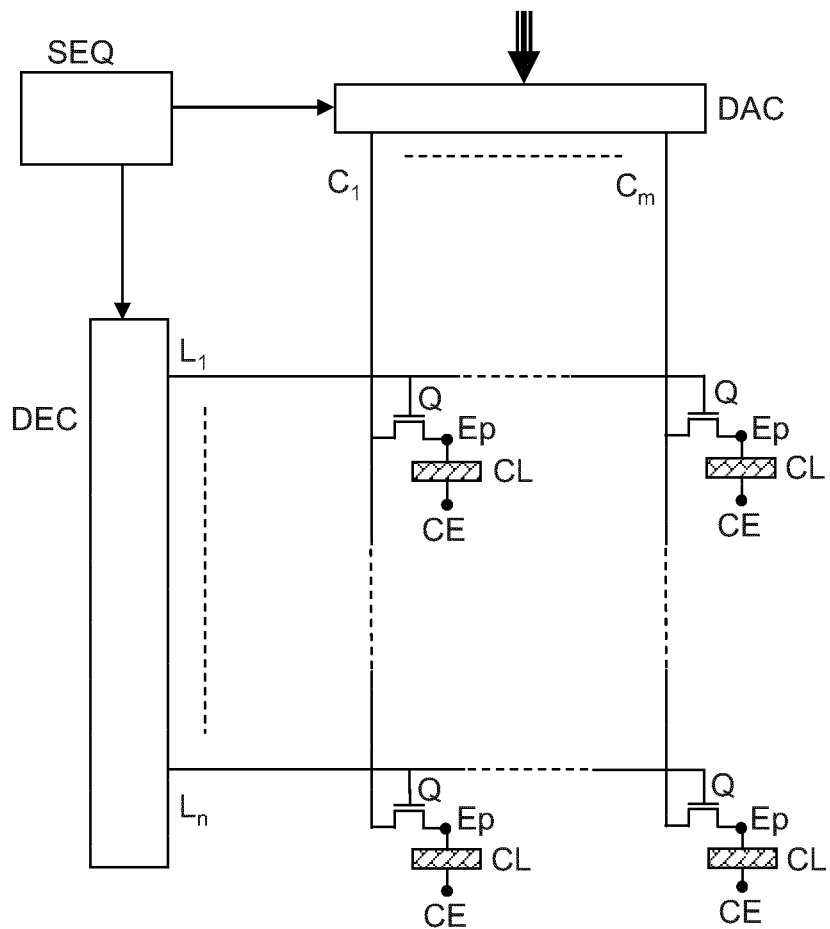
FIG. 1, already described, shows the schematic electrical circuit diagram of a liquid crystal matrix display.

The explanations given in relation to FIG. 1, which remain valid in the following part of the description, will not be repeated.

Figure 2:
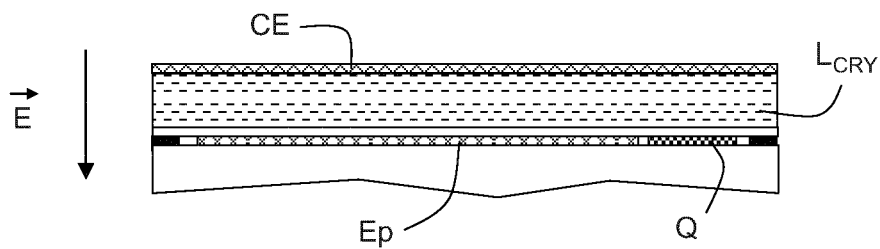
FIG. 2 shows a vertical cross-section of a conventional pixel structure using switching by an electric field perpendicular to the plane.

In the most usual structures of displays, such as that shown in cross-section in FIG. 2, a plane layer of liquid crystal $L_{CRY}$ is enclosed between two parallel plane electrodes Ep (pixel electrode) and CE (counter-electrode common to all the pixels). The electrodes Ep and CE are made of indium-tin oxide, so as to be transparent, if the display is of the transmissive type. The electric field E which orients the molecules of the liquid crystal in order to establish luminance information is vertical, in other words perpendicular to the plane of the layer of liquid crystal which is the plane of the matrix of pixels. In the absence of an electric field, the molecules have a rest position, for example horizontal, in other words parallel to the plane of the liquid crystal; in the presence of an electric field, they tend to orient themselves vertically and the tendency is greater the stronger the field.

Figure 3:
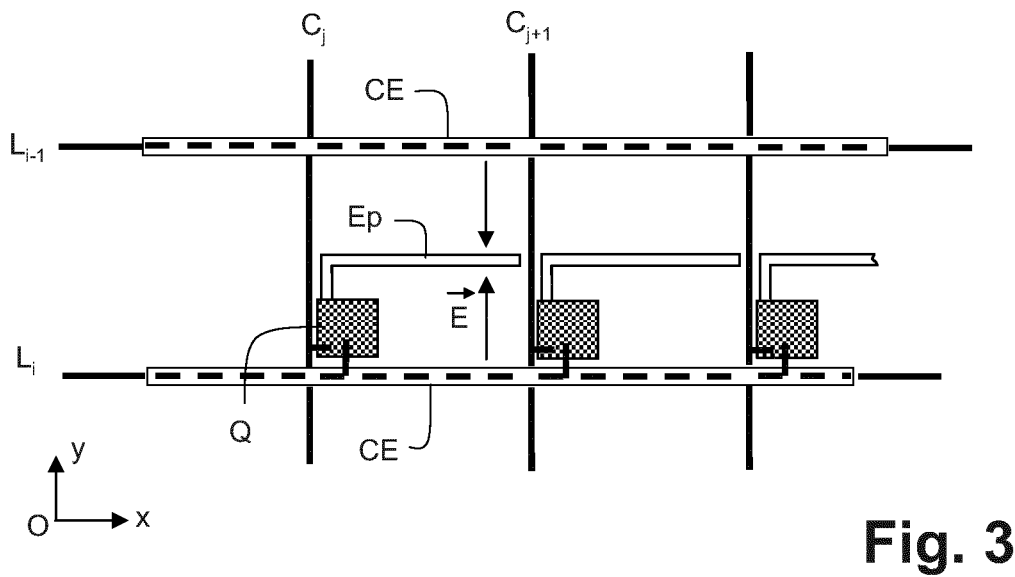
FIG. 3 shows a top view of a pixel arrangement using switching by an electric field in the plane.

As opposed to this type of structure, a structure of display is considered here such as that which is shown as a top view in FIG. 3, in which the electric field E that orients the molecules is a horizontal field, in the plane of the matrix. This field is produced by the potential difference between the pixel electrode and the counter-electrode, both being situated in the same plane and on the same side of the liquid crystal. This type of construction is possible in particular for pixels with small dimensions, in particular pixels whose lateral dimensions are of the same order as the liquid crystal thickness, in other words a few micrometers.

In the absence of an electric field, the molecules have a rest orientation in a direction in the plane of the display; this orientation is dictated by their physical constitution and by the direction of the friction applied to one of the walls enclosing the liquid crystal. The axis of orientation is considered as the axis with the highest index of the ellipsoid of the indices of refraction of the liquid crystal. In the presence of an electric field having a component in a direction perpendicular to the rest direction, the molecules undergo a rotation in the plane of the liquid crystal and tend to orient themselves perpendicularly to the rest position, and this tendency is greater the stronger the field. Crossed polarizers allow this change in orientation to be transformed into a change in light transmission coefficient.

In order to produce this field, a pixel electrode Ep is provided that is elongated in a direction Ox of the plane, which is the direction of orientation of the molecules at rest or close to the direction at rest, and two counter-electrodes CE, one on either side of the pixel, parallel to the pixel electrode Ep. There could be several pixel electrodes parallel to one another, interleaved with several counter-electrodes, but in the following only one electrode Ep will be considered passing in the middle of the space between the two counter-electrodes CE.

In the example in FIG. 3, the pixel electrode Ep is composed of a narrow conducting strip parallel to the counter-electrodes half-way between the two counter-electrodes in such a manner that an electric field of the same amplitude is applied on either side of the electrode. The liquid crystal is sensitive to the amplitude but not to the direction of the electric field and, consequently, the fact that the direction of the field is reversed on either side of the electrode Ep is not an issue.

Figure 4:
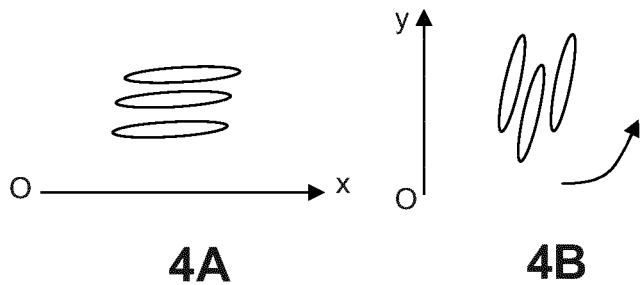
FIG. 4 shows the rotation of the liquid crystal molecules in the plane in the presence of an electric field perpendicular to the direction of the molecules at rest.

FIG. 4 shows schematically the orientation of the liquid crystal molecules at rest (4A) in a direction close to the direction Ox and in the presence of an electric field in the direction Oy between the pixel electrode and the counter-electrodes. In the presence of an electric field, the molecules rotate in the plane, the mean angle of rotation of the molecules of the pixel being linked to the amplitude of the electric field.

The pixel electrodes Ep and the counter-electrodes may be made of non-transparent material (copper or aluminum for example), as long as they are as thin as possible so as not to mask the light too much. Conducting strips 0.2 micrometers in width can be formed in displays using LCOS technology whose pixels are a few micrometers on a side. A damascene technology for copper inlay is well adapted to this. The counter-electrodes are then preferably situated on top of the row conductors $L_i$, $L_{i+1}$ (which allow the sequential addressing of the rows), in such a manner as to limit the masking of the light; they could also be situated on top of the column conductors $C_j$ (which provide the gray-scale level) rather than on the row conductors $L_i$. In the following, it will be considered that the pixel electrodes and the counter-electrodes are oriented in the direction Ox parallel to the horizontal "rows" of pixels, the word "row" being able to signify either an alignment of pixels in the direction of the addressing rows or an alignment of pixels in the direction of the columns supplying gray-level signals. The counter-electrodes are common to all the pixels of a horizontal row, in other words they run along the entire length of the row.

Figure 5:
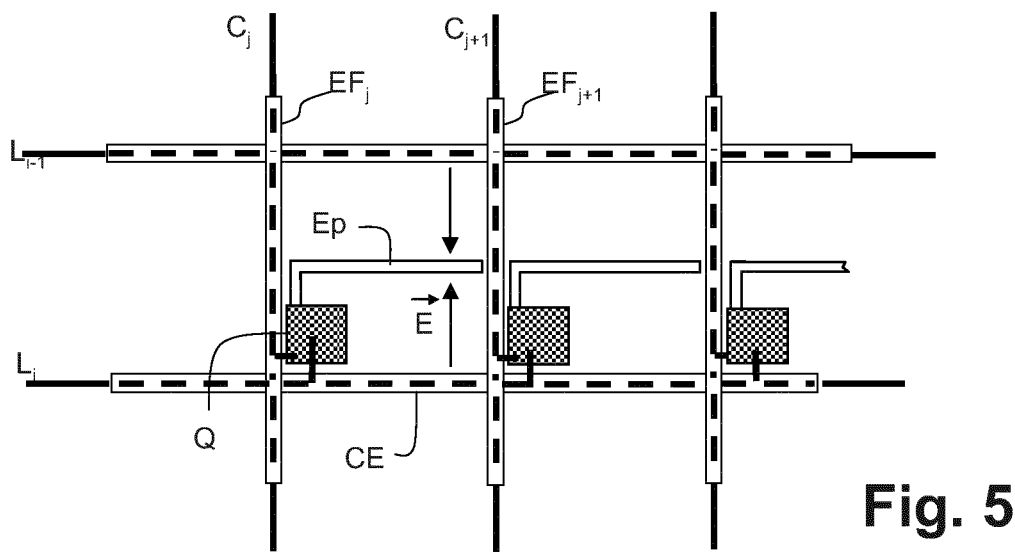
FIG. 5 shows a pixel structure according to the invention equipped with erase electrodes.

FIG. 5 shows a top view of the general structure of the pixels of a display according to the invention. The description of FIG. 3 remains applicable to FIG. 5 but FIG. 5 differs from FIG. 3 in that electrodes referred to as "erase electrodes" have been added; these are preferably (but not necessarily, as will be seen) perpendicular to the direction of the pixel electrodes and of the counter-electrodes; each erase electrode is common to all the pixels of a vertical column and runs along the entire length of this column.

In the case of FIG. 5, the pixel electrodes and counter-electrodes (horizontal rows) are parallel to the direction of the rows of pixels and the erase electrodes (vertical columns) are parallel to the columns of pixels but the reverse would be possible.

The erase electrodes $EF_j$, $EF_{j+i}$ are disposed on top of the column conductors in such a manner as to mask the light as little as possible. The erase electrodes are indeed opaque since it is desirable to avoid using conductors made of indium-tin oxide; in practice, they are made of copper or aluminum like the pixel electrodes and counter-electrodes. The erase electrodes run all along the column conductors: they are common to a whole set of pixels in a column. They are used to apply an erase electric field in the direction Ox of the rows so as to bring the liquid crystal molecules back into this direction after they have been shifted more or less from this position during a preceding write phase. In order to establish this erase electric field, various potentials (for example two opposing potentials) are applied to the two erase electrodes $EF_j$ and $EF_{j+1}$ which frame a column of pixels of rank j. The erase electrodes are shared between the adjacent pixels, in other words an erase electrode situated on a pixel edge is also used for the other pixel adjacent to this edge.

It is preferable to have as many erase electrodes as there are vertical columns of pixels but this is not obligatory. It is not even necessary for the pitch of the erase electrodes to be the same as the pitch of the pixels or a multiple or sub-multiple of this pitch. However, the solution with a pitch equal to that of the pixels allows the erase electrodes to be disposed just above or below the row or column conductors; this avoids the optical aperture of the pixels being reduced by the presence of erase electrodes, especially if the latter are opaque.

Figure 6:
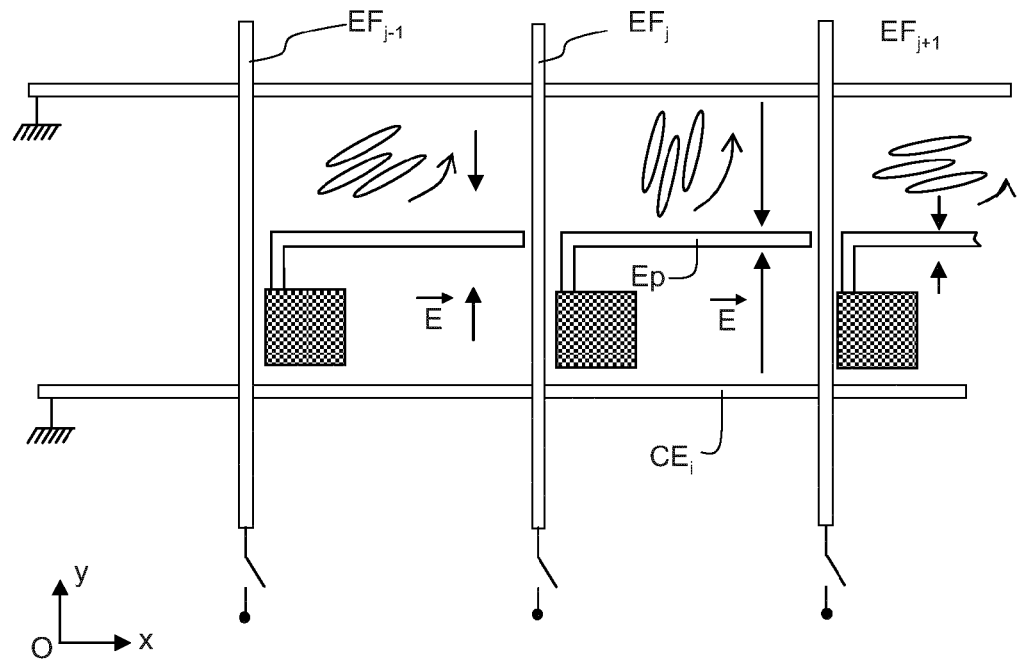
FIG. 6 shows the action of an image write phase on the molecules of the liquid crystal.
Figure 7:
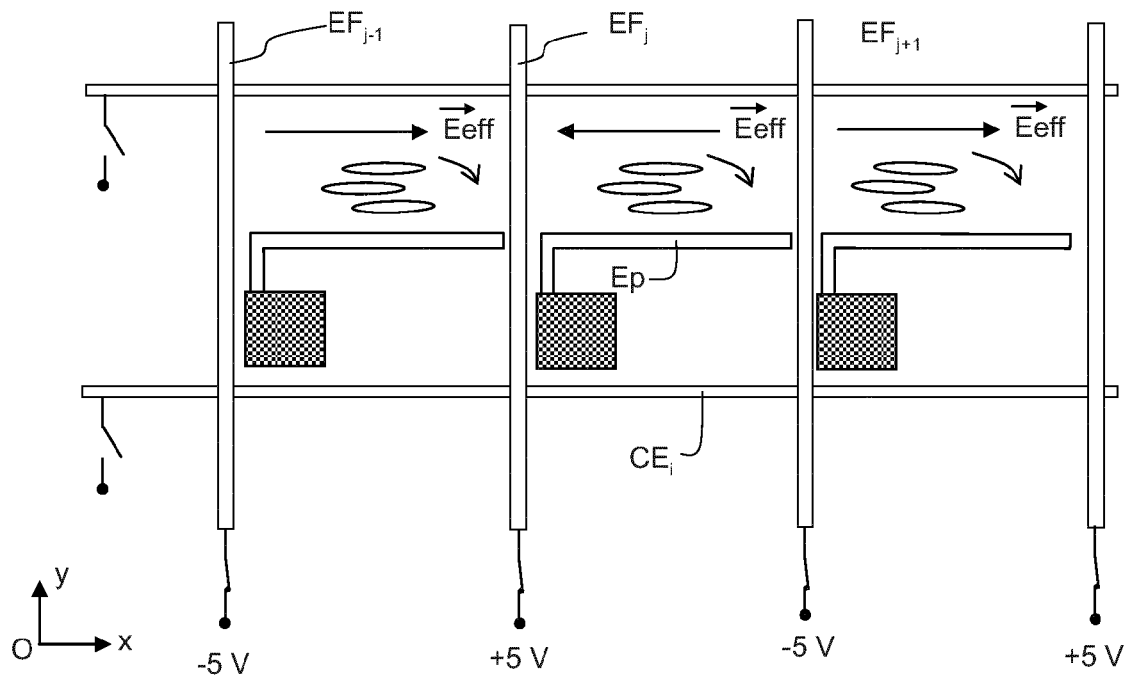
FIG. 7 shows the action of an erase phase.

FIGS. 6 and 7 show a diagram of a simplified structure analogous to that in FIG. 5, but in which the row and column conductors are not shown in order to facilitate the readability, it being recalled that the row conductors can anyway be oriented in either the direction Ox or in the direction Oy, the column conductors being in the other direction. FIG. 6 indicates the potentials applied to the electrodes during a phase for writing luminance information and for holding the luminance information; FIG. 7 indicates the potentials applied during an erase phase preceding a new write phase.

FIGS. 6 and 7 show symbolically in the form of ovals the general orientation of the liquid crystal molecules during these phases. These represent a mean orientation: indeed, the liquid crystal is situated between two walls, one of which (preferably the wall on the light entry side) is rubbed in such a manner as to impose the rest orientation of the molecules (in the absence of an electric field). The plane is rubbed preferably in the direction of the counter-electrodes (direction Ox in FIGS. 6 and 7) or, as will be seen, with a small tilt angle with respect to the direction Ox; the write electric field is in the perpendicular direction Oy and its intensity varies according to the luminance signal level applied to the pixel.

The different orientations shown for the three pixels in FIG. 6 signify that the luminance signal levels applied to the three pixels are different.

Conventionally, crossed polarizers frame the matrix of pixels: an entry polarizer and an exit analyzer. This point will be discussed later on.

During the row write phase (FIG. 6) and during the hold phase that follows the writing and which lasts for the remainder of the frame, the counter-electrodes CE are all at a reference potential which can be ground or which may alternate from one frame to the next between a low potential Vmin (negative) and a high potential Vmax (positive). This switching of the reference potential allows the direction of the write electric fields to be periodically reversed so as to avoid phenomena of permanent polarization of the liquid crystal. During the write phase and the hold phase, the erase electrodes are left in a high impedance state so as not to generate an undesirable electric field which could interfere with the writing or the retention of the written image.

During the erase phase (FIG. 7), an erase electrode receives a low erase potential and the adjacent electrodes receive a high erase potential, in such a manner as to apply an electric field in the direction Ox. The low potential can be ground and the high potential can be a positive power supply potential Vdd, but a negative potential (for example −5 volts) and an opposing positive potential (for example +5 volts) are also possible. This is what is shown in FIG. 7: all the electrodes of even rank are at −5 volts, and all the electrodes of odd rank are at +5 volts. The fields are in opposite directions from one pixel to the other, but what is important is the amplitude and not the direction of the field. It will be seen that the erase phase may be divided into two half-phases by applying to the electrodes potentials that are inverted from one half-phase to the other, or even a succession of inversions of potential.

In this erase phase, the liquid crystal molecules tend to align themselves in the direction of the electric field and hence in the direction Ox. The counter-electrodes and the pixel electrodes are held in a high impedance state during the erase phase so as not to create an unwanted field that would interfere with the re-alignment of the molecules in the direction Ox.

In the preceding paragraphs, it has been considered that a wall enclosing the liquid crystal was rubbed in such a manner as to give the liquid crystal molecules a rest orientation in the direction Ox of the counter-electrodes. It is however preferable for the orientation of the molecules at rest to be slightly tilted with respect to the direction Ox. Thus, when a write electric field E is applied between the pixel electrode and the counter-electrode in the direction Oy, the molecules will rotate preferentially in the easiest direction which results from this initial tilt.

Figure 8:
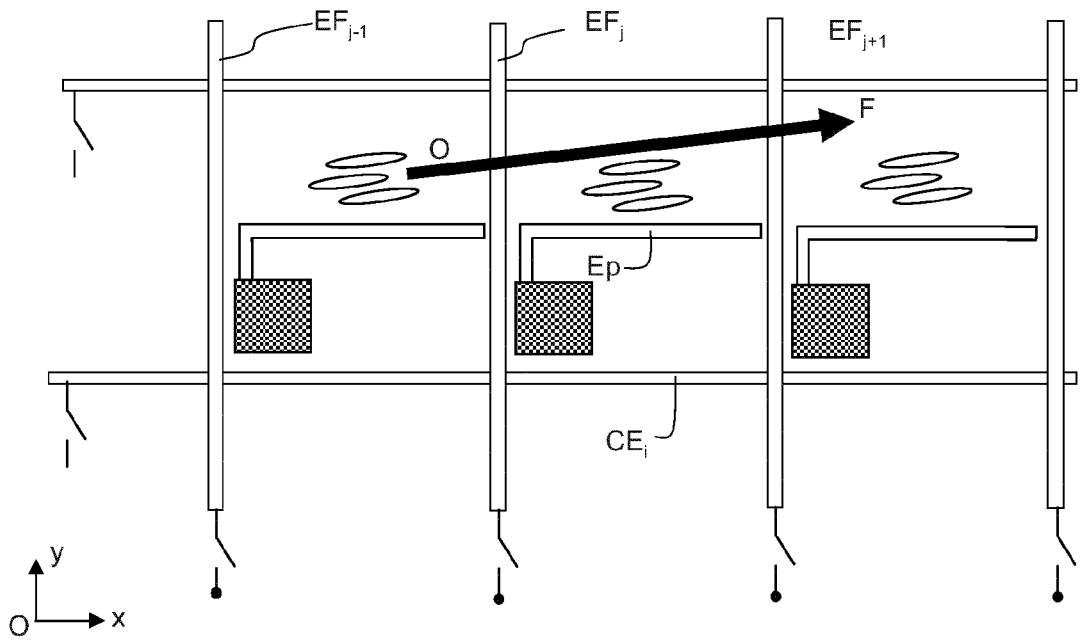
FIG. 8 shows the final state of the molecules at the end of an erase phase.

FIG. 8 shows, in the form of a thick tilted arrow OF, the direction of the molecules at rest, given by the friction of the wall. The molecules naturally (but slowly) return to this orientation at the end of the erase phase in FIG. 7, when the ground and Vdd potentials cease to be applied to the counter-electrodes and they are returned to a high impedance state prior to a new write phase.

The tilt angle of the molecules at rest can for example be from 5 to 20°, preferably 10°.

Figure 9:
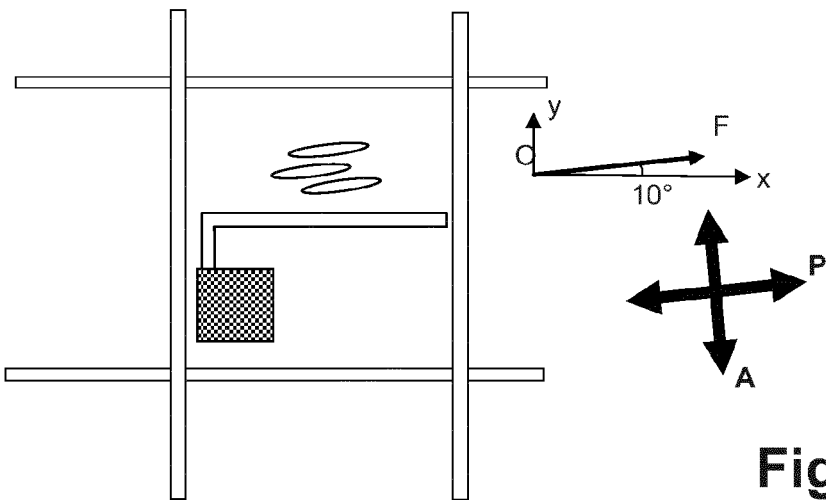
FIG. 9 shows the preferred orientation of the crossed polarizers framing the matrix of liquid crystal pixels.

The crossed polarizers associated with the matrix of pixels will preferably be oriented with one in the direction OF of the friction, and the other in the direction perpendicular to the friction (FIG. 9). The polarizer placed on the side of the incident light is preferably oriented in the direction OF so as to allow the light polarized in this direction to pass to the liquid crystal. The analyzer placed on the exit side is then oriented in the perpendicular direction.

For simplicity of the design of the erase electrodes, an orientation in the direction Oy parallel to the columns of pixels is preferably given to the erase electrodes even in the case where the direction of friction is tilted with respect to the direction Ox of the rows. However, this is not obligatory, and if making the design of the erase electrodes more complicated is acceptable, it may be envisioned for the erase electrodes to be oriented perpendicularly to the direction of friction OF; this means that the erase electric field will really be in the direction of the molecules at rest. This amounts to endowing these electrodes with a general aspect of a sawtooth: erase electrodes inclined perpendicularly to OF but running along the row of pixels in the general direction Oy. The column conductors then advantageously follow this sawtooth design. Alternatively, it may be provided for the direction of friction to be parallel to the rows (or columns of pixels) and for the counter-electrodes CE to have a sawtooth design so as to be tilted slightly obliquely with respect to the direction of the rows, the pixel electrode being parallel to the counter-electrodes, hence slightly tilted, in such a manner as to produce an electric field which is not perpendicular to the direction of friction Ox; the erase electrodes are then parallel to the columns (Oy) and establish a field in the direction of friction.

The structure according to the invention is particularly adapted to a fabrication process using microelectronics technology. The display is fabricated from an integrated circuit chip using LCOS technology and the fabrication is collective for a batch of displays starting from a silicon wafer.

The fabrication process comprises the formation of all the circuitry on the silicon substrate, including the pixel electrodes, the counter-electrodes and the erase electrodes. It is not necessary to provide any post-processing (after the installation of the liquid crystal) for the deposition of these electrodes, whereas it was necessary to do this in the case of control by a vertical electric field (perpendicular to the plane of the liquid crystal), especially with indium-tin oxide electrodes.

Figure 10:
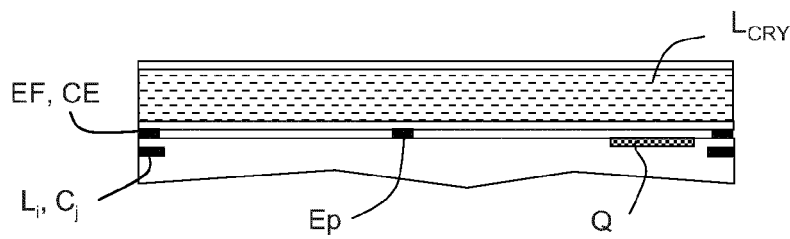
FIG. 10 shows a vertical cross-section of the position of the electrodes nearest to the liquid crystal.

In any event, it will be arranged for all these electrodes, which control the liquid crystal by applying a write or erase electric field, to be disposed as close as possible to the liquid crystal. Consequently, assuming that the electrodes are formed on the front face of a silicon substrate, these electrodes will be formed if possible using the final metallization level. The row and column conductors must, on the other hand, be formed within lower levels since they can be further from the liquid crystal given that they do not have to play a role of applying an electric field. FIG. 10 shows schematically a cross-sectional view in which the electrodes Ep, CE and EF are as near to the liquid crystal as possible, whereas the row and column conductors are further away from it. A layer that is slightly electrically conducting but transparent may be provided on the wall or walls enclosing the liquid crystal, in order to evacuate electrical charges that could accumulate there.

If electrodes of the same conductor level have to cross one another, vias and conductors in lower levels will preferably be used in order to enable the crossing without short-circuit. This is for example the case for the counter-electrodes which run all along a row or column of pixels and for the erase electrodes which run perpendicularly to the former all along a column or row perpendicular to the former.

Figure 11:
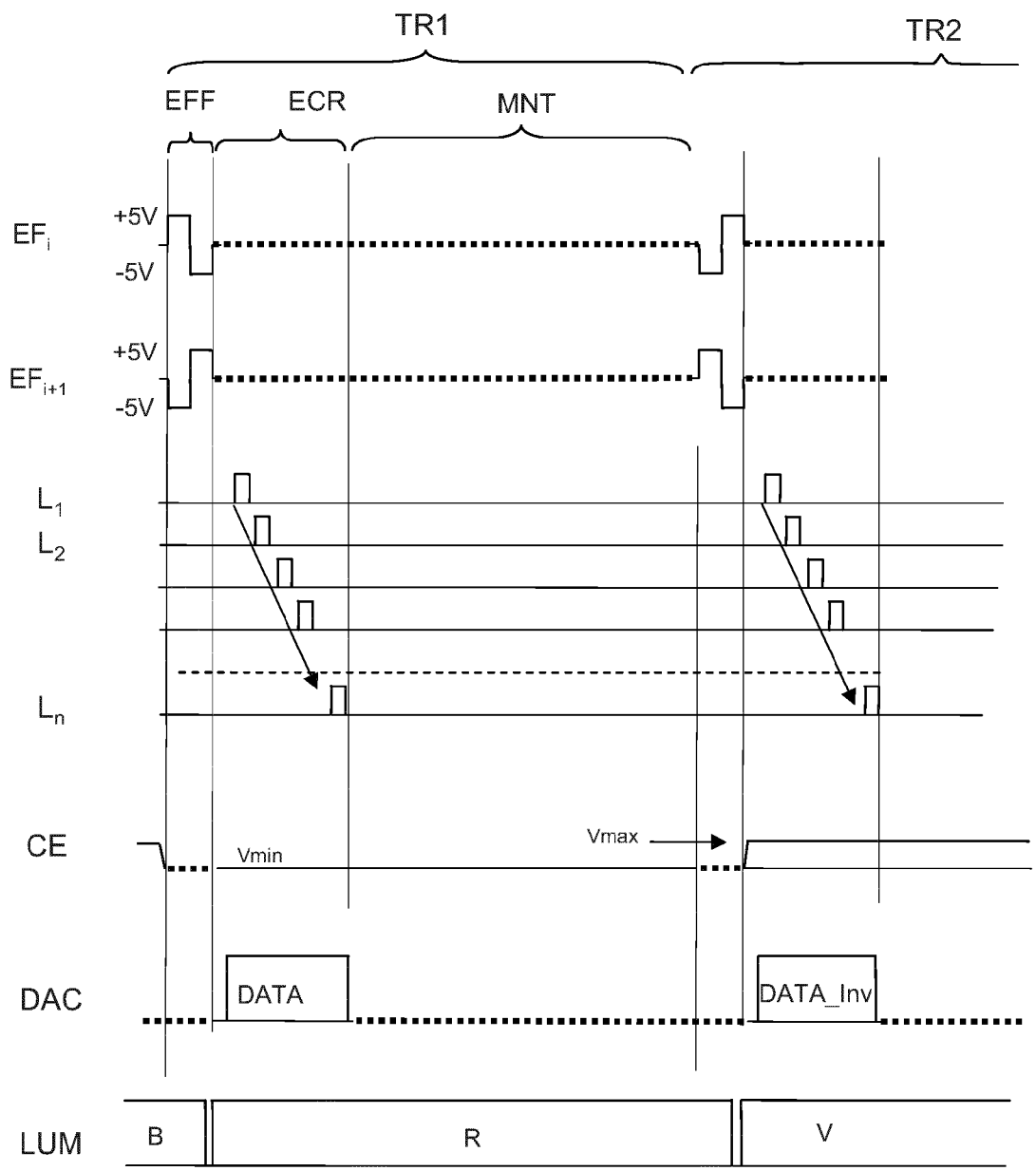
FIG. 11 shows a timing diagram of operation of the display in color sequential mode.

FIG. 11 shows a timing diagram for the signals applied to the various electrodes (including the addressing row conductors and the data column conductors) during the erase, write and hold phases. This diagram is traced considering that color sequential mode is used; two successive frames TR1 and TR2 therefore correspond to illuminations by different sources of light, for example red (R) and green (V), a third frame corresponding to the color blue (B); a pixel firstly receives luminance information corresponding to the first color and subsequently luminance information corresponding to the second color, etc.

Each frame comprises successively an erase phase EFF, a write phase ECR, and a hold phase MNT.

The erase phase EFF, at the start of each frame, can consist in applying a negative voltage to the even erase electrodes and a positive voltage to the odd erase electrodes, as has been explained with reference to FIG. 7. It may also be provided for the erase operation to be carried out in two successive half-phases in which a potential difference of a given sign is applied between two adjacent electrodes, after which a potential difference of the opposite sign is applied between these same electrodes. It is this latter solution which is adopted in the timing diagram shown in FIG. 9. Moreover, for two given electrodes, it is also provided in this example for the sign of the potential difference during the first erase half-phase to be reversed following a change of frame.

The counter-electrode CE is held in a high impedance state during at least a part of the erase phase (representation of the high impedance state by a thick dotted line in FIG. 11). The pixel electrode is also held in a high impedance state, preferably throughout the entire erase phase.

The erase phase EFF is followed by a write phase ECR during which the rows of pixels are written one after the other. The addressing of a row of rank i consists in applying a short addressing pulse to the row conductor $L_i$ so as to render the transistors Q of the pixels of this row conducting; during this time, a desired analog luminance level for each pixel of this row is applied to the column conductor corresponding to this row. The addressing pulses last the time needed for the control transistors Q to be able to charge the capacitance formed by the pixel and potentially the storage capacitors of the circuit. The pulses are applied successively for the writing of the various rows $L_1$ to $L_n$ and do not overlap so that the transistors of only one row are simultaneously conducting.

The digital data DATA corresponding to the gray-scale levels to be applied to the pixels of the successive rows are converted and applied in the form of an analog voltage to the column conductors in synchronism with the selection of the corresponding rows. During this time, a fixed potential, denoted by Vmin, is applied to the counter-electrode. The analog voltage representing the luminance is therefore referenced with respect to this level Vmin during the frame TR1.

However, during the following frame TR2, the reference level for the counter-electrode is preferably modified to become Vmax as can be seen in FIG. 11. The digital data defining the luminance are then inverted so that the analog voltage produced is then referenced with respect to Vmax, and this is symbolized in FIG. 11 by the term "DATA_inv" for the luminance data of the second frame TR2.

In one numerical example, the voltages Vmin and Vmax are −1.5 volt and +1.5 volts, respectively.

During the write phase, the erase electrodes $EF_i$, $EF_{i+1}$ are held in a high impedance state, as indicated by the thick dotted lines in FIG. 11.

The hold phase MNT lasts until the end of the frame after the end of the write phase. During this phase, the analog voltage levels representing the luminances are no longer applied to the transistors, but these levels are conserved on the pixel electrodes by reason of the self capacitance of each liquid crystal cell or by reason of an auxiliary storage capacitor placed in parallel between each pixel electrode and the counter-electrode. The pixel electrodes Ep are therefore in a high impedance state, and this is shown symbolically in FIG. 11 by the thick dotted line present between two successive phases of data writing DATA.

The erase electrodes remain in a high impedance state during the hold phase just as they were during the write phase.

At the end of a frame, it may be provided for the value of the luminance signal to be reset to zero over all the pixel electrodes, either row by row or preferably all at once, prior to carrying out the erase phase. The voltage, and hence the electric field, is thus minimized between the pixel electrodes and the counter-electrode (which, although in the high impedance state, tends to conserve the potential that it had during the hold phase). This facilitates the return of the liquid crystal molecules to the rest position. The zero level thus applied to all the electrodes is referenced with respect to the level that the counter-electrode had in the frame which ends with this erase phase.

At the end of the erase phase, the light source switching can be carried out (line LUM in FIG. 11); the liquid crystal screen is preferably of the "normally dark" type, in other words that does not let the light pass in the absence of an electric field between a pixel electrode and the counter-electrode or counter-electrodes, and this is why the light source switching at the end of the erase phase is very appropriate.

In one numerical example, the duration of a frame is 8 milliseconds (24 milliseconds for a succession of three frames of primary colors red green blue); the duration of the erase phase can be 1 millisecond; the duration of the write phase can be one to two microseconds hence 1 to 10 microseconds depending on the number of rows; the duration of the hold phase overall will be 5 to 7 milliseconds; re-write phases may however be provided during this period in order to ensure the retention of the signal, notably if the storage capacitor is small.

In summary, amongst the advantages of the invention, the following may be mentioned:

- the possibility of an improved operation in color sequential mode at a normal frame rate of 24 color images per second;
- the reduction of the fabrication costs by eliminating the layers of indium-tin oxide;
- the elimination of the layer deposition and etch post-processing steps, in other words after the transfer of the integrated circuit substrate comprising the active matrix onto a transparent substrate designed to receive the liquid crystal;
- an excellent performance in terms of viewing angle, due in particular to the fact that the liquid crystal molecules stay oriented in the plane of the matrix even in the presence of an electric field;
- the absence of a need for viewing angle compensation films;
- the possibility of operating in normally dark mode;
- a black color that is hardly sensitive to the viewing angle and to the color of the light source.

The invention claimed is:

1. A liquid crystal display comprising a matrix of horizontal rows and vertical columns of pixels and, for each pixel, a liquid crystal cell, a pixel electrode controlled by a control transistor and at least two counter-electrodes situated on the same side of the liquid crystal as the pixel electrode, the liquid crystal being composed of molecules having a natural rest orientation in the plane of the display in the absence of a voltage between the pixel electrode and the counter-electrodes and another orientation in the plane of the display in the presence of a voltage between the pixel electrode and the counter-electrodes, this display further comprising an array of erase electrodes, and means for applying between two neighboring erase electrodes, during an erase phase, an erase electric field in a direction tending to return the molecules of the liquid crystal toward their rest orientation, wherein the counter-electrodes are parallel to the pixel electrode and common to all the pixels of a horizontal row, and each erase electrode runs along a vertical column of pixels and is common to the pixels of this vertical column.

2. The display as claimed in claim 1, wherein the array of erase electrodes is situated on the same side of the liquid crystal as the pixel electrode and the counter-electrode.

3. The display as claimed in claim 2, wherein there are two erase electrodes for each vertical column of pixels, one on either side of the pixel, and the erase electric field is established by applying different potentials to the two erase electrodes that frame the pixel.

4. The display as claimed in claim 3, wherein the two erase electrodes common to all the pixels of the same vertical column of pixels are shared between two adjacent columns, and the counter-electrodes common to all the pixels of the same horizontal row are shared between two adjacent horizontal rows.

5. The display as claimed in claim 1, wherein the matrix comprises addressing row conductors and luminance data column conductors, and in that the erase electrodes, the pixel electrodes and the counter-electrodes are formed within a final level of conducting metal, closer to the liquid crystal than levels of conducting metal used for the addressing row conductors and the luminance data conductors.

6. The display as claimed in claim 5, wherein the erase electrode is superposed on an addressing row conductor of the pixel or on a luminance data column conductor, and the counter-electrodes are superposed on a column conductor or on an addressing row conductor.

7. The display as claimed in claim 1, wherein the pixel electrodes, the erase electrodes and the counter-electrodes are formed from a non-transparent conducting metal such as copper or aluminum.

8. The display as claimed in claim 1, wherein the erase electrodes are perpendicular to the counter-electrodes or to the direction of the molecules at rest.

9. The display as claimed in claim 1, wherein the orientation of the liquid crystal molecules at rest is angularly offset by 5° to 20° with respect to the direction of the pixel electrode and of the counter-electrode, in order to favor a given sense of rotation of the molecules when a write electric field is applied perpendicularly to the pixel electrode and to the counter-electrode.

10. The display as claimed in claim 1, wherein the active matrix is fabricated starting from a semiconductor substrate, and further comprising means for synchronizing with the control of colored light sources for an operation in color sequential mode.

11. The display as claimed in claim 10, wherein the display is of a transmissive type.

12. The display as claimed in claim 1, further comprising means for displaying successive image frames, each frame displaying comprising:

an erase phase during which a potential difference is applied between two erase electrodes framing a pixel;

an image write phase, during which the erase electrodes are held in a high impedance state, the counter-electrodes are held at a reference potential, and an analog voltage representing the luminance is applied to the pixel electrode, and a hold phase during which the erase electrodes and the pixel electrode are placed in a high impedance state, and the counter-electrodes are held at the reference potential.

13. The display as claimed in claim 12, further comprising means for holding the pixel electrode and the counter-electrodes in a high impedance state during at least a part of the erase phase.

14. The display as claimed in claim 12, further comprising means for controlling the erase electrodes of two adjacent vertical columns in at least two phases for establishing an electric field in alternate directions between these electrodes during an erase phase.

15. The display as claimed in claim 1, the erase electrodes are arranged electrically into two groups of interleaved electrodes, for a common erasure of the whole matrix, an electric field being established between two neighboring electrodes, one belonging to the first group, the other to the second group.

* * * * *